United States Patent
Laifenfeld et al.

(10) Patent No.: US 10,389,751 B2
(45) Date of Patent: Aug. 20, 2019

(54) WIRELESS DATA SECURITY BETWEEN VEHICLE COMPONENTS

(71) Applicant: GM Global Technology Operations LLC, Detroit, MI (US)

(72) Inventors: Moshe Laifenfeld, Haifa (IL); Gill R. Tsouri, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/708,208

(22) Filed: May 9, 2015

(65) Prior Publication Data

US 2016/0330629 A1    Nov. 10, 2016

(51) Int. Cl.

| | | |
|---|---|---|
| *H04W 12/10* | (2009.01) | |
| *H04L 29/06* | (2006.01) | |
| *H04W 12/06* | (2009.01) | |
| *H04W 12/12* | (2009.01) | |
| *B60R 16/023* | (2006.01) | |

(52) U.S. Cl.
CPC ......... *H04L 63/1466* (2013.01); *H04W 12/06* (2013.01); *H04W 12/12* (2013.01); *B60R 16/023* (2013.01)

(58) Field of Classification Search
CPC ... H04W 12/10; B60R 16/023; H04L 63/1466
See application file for complete search history.

(56) References Cited

U.S. PATENT DOCUMENTS

| | | | | |
|---|---|---|---|---|
| 5,703,414 A * | 12/1997 | Mutoh | ............... | B60R 25/04 180/287 |
| 6,946,949 B2 * | 9/2005 | Heide | ............... | B60R 25/24 340/5.61 |
| 7,506,540 B1 * | 3/2009 | Job | ............... | B60C 23/0416 340/447 |
| 7,840,225 B2 * | 11/2010 | Crawford | ............... | G01S 5/021 455/13.2 |
| 7,952,519 B1 * | 5/2011 | Nielsen | ............... | G01S 19/215 342/357.59 |
| 8,918,232 B2 * | 12/2014 | Lavi | ............... | G07C 5/008 455/421 |
| 2002/0080938 A1 * | 6/2002 | Alexander, III | ............... | H04L 41/22 379/106.01 |
| 2003/0156025 A1 * | 8/2003 | Okubo | ............... | B60C 23/0416 340/447 |
| 2005/0001716 A1 * | 1/2005 | Yamashita | ............... | B60C 23/0416 340/442 |
| 2011/0184586 A1 * | 7/2011 | Asano | ............... | G05B 15/02 700/297 |
| 2013/0227648 A1 * | 8/2013 | Ricci | ............... | G06F 3/0484 726/3 |

* cited by examiner

*Primary Examiner* — Carl G Colin
*Assistant Examiner* — Vance M Little
(74) *Attorney, Agent, or Firm* — Reising Ethington P.C.; David Willoughby

(57) ABSTRACT

A mobile vehicle communications system and a method of determining the legitimacy of a wireless sensor signal received by an electronic control unit (ECU) in a vehicle. The method includes the steps of: receiving at the electronic control unit (ECU) a first wireless signal identified as being from a first vehicle sensor; performing a correlation procedure at the ECU using the first wireless signal; and based on the correlation procedure, determining whether the first wireless signal is a legitimate signal sent by the first vehicle sensor.

12 Claims, 4 Drawing Sheets

WIRELESS DATA SECURITY BETWEEN VEHICLE COMPONENTS

TECHNICAL FIELD

The present invention relates to transmission of secure wireless data between vehicle components.

BACKGROUND

Some wireless communication networks comprise a wireless controller for performing task(s) in response to data received via transmissions from one or more wireless sensors. The data shared over such networks is susceptible to interception and/or manipulation by hackers and/or other malicious persons and techniques. In order to subvert these activities, cryptography and laborious computational techniques have been employed. Such anti-hacking technology and techniques often include additional hardware, software, and processing techniques. This increases design costs, occupies a larger spatial footprint (e.g., to make room for the hardware), and hampers processing speed and/or response time of the system.

Due to these and other similar drawbacks, wireless communication between a vehicle electronic controller and vehicle sensors traditionally has been undesirable. For example, additional computational hardware is costly; similarly in vehicle applications, additional hardware may be undesirable in view of vehicle space and weight requirements. And additional processing performed to enhance security but which also slows down response time may not be desirable for safety reasons (e.g., when rapid response time is needed, such as during collision avoidance). Thus, there is a need for a secure means for communicating data between a vehicle ECU and one or more wireless vehicle sensors while limiting increased cost, minimizing spatial requirements, and not inhibiting wireless communication speed.

SUMMARY

According to an embodiment of the invention, there is provided a method of determining the legitimacy of a wireless sensor signal received by an electronic control unit (ECU) in a vehicle. The method includes the steps of: receiving at the electronic control unit (ECU) a first wireless signal identified as being from a first vehicle sensor; performing a correlation procedure at the ECU using the first wireless signal; and based on the correlation procedure, determining whether the first wireless signal is a legitimate signal sent by the first vehicle sensor.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system described below includes a vehicle communication network that enables wireless communication between two or more vehicle sensors and at least one electronic control unit (ECU) in the vehicle. In some instances, the data conveyed between the sensors and the ECU can be sensitive and a target of malicious attack (e.g. spoofing of one of the vehicle sensors). This system uses one or more correlation techniques to detect malicious attacks so that, e.g., such spoofed data can be ignored.

Communications System—

Figure 1:
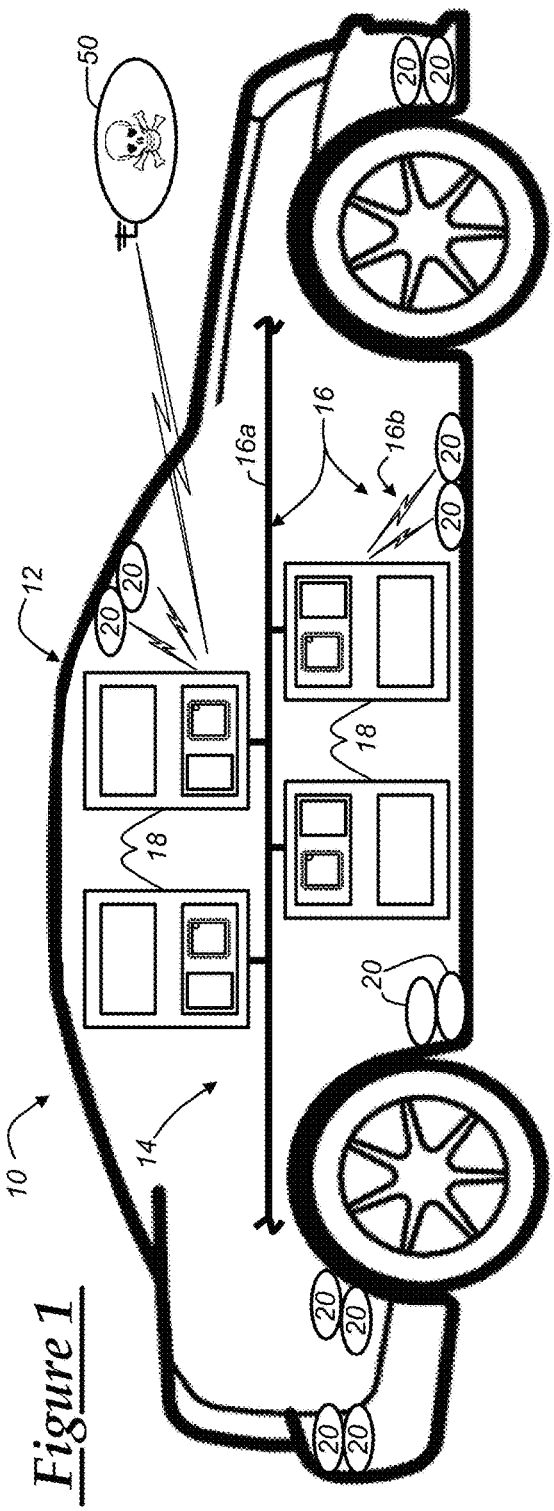
FIG. 1 is a block diagram depicting an embodiment of a communications system that is capable of utilizing the methods disclosed herein.

With reference to FIG. 1, there is shown an operating environment that comprises a mobile vehicle communications system 10 and that can be used to implement the method disclosed herein. Communications system 10 generally includes a vehicle 12 suitably capable of communicating with one or more wireless carrier systems, land communications network(s), user mobile device(s), and, in some implementations, a backend system that comprises remote server(s) and/or a data service center (e.g., that may include a call center). Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 12 may include a vehicle communication network 14 that includes one or more communication links or connections 16, one or more vehicle system modules (VSMs) 18, and a number of sensors 20.

Figure 2:
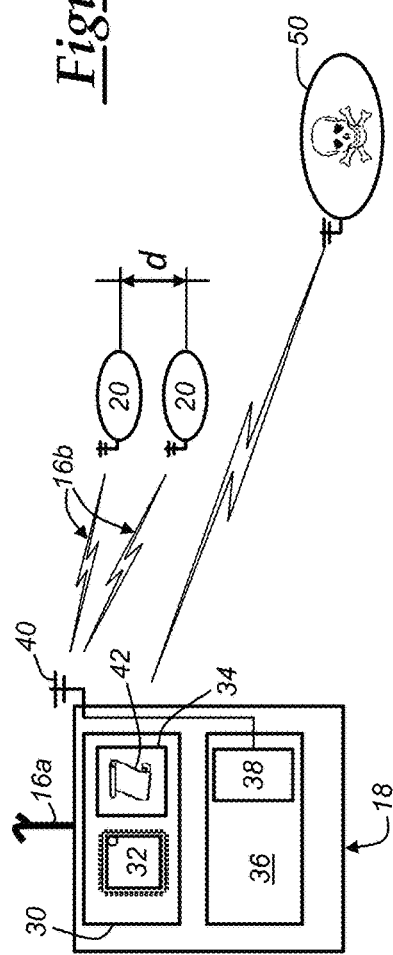
FIG. 2 is an enlarged view of a portion of the communications system shown in FIG. 1.

Communication link(s) 16 include any wired link or connection 16a, any wireless link or connection 16b, or a combination of both. In the illustrated implementation, both are shown; however, this is merely an example and other implementations are possible. Wired link 16a is shown connecting or physically coupling the VSMs 18 to one another. Non-limiting examples of wired connection 16a include a communications bus, an entertainment bus, or the like which may utilize one or more of the following: a controller area network (CAN), a media oriented system transfer (MOST), a local interconnection network (LIN), a local area network (LAN), and other appropriate connections such as Ethernet, Audio-Visual Bridging (AVB), or others that conform with known ISO, SAE and IEEE standards and specifications, to name but a few. As shown in FIGS. 1-2, wireless links 16b are shown connecting or wirelessly coupling sensors 20 to the VSMs 18. FIG. 2 illustrates one of the VSMs 18 of FIG. 1 having wireless links 16b to two proximately located sensors; however, this is merely an example. VSM 18 could have a wireless link 16b to three or more sensors or another VSM 18 or two VSMs 18 could be linked wirelessly to one or more sensors, etc. Wireless links 16b may utilize one or more short-range wireless communication (SRWC) protocols such as any of the IEEE 802.11 protocols, WiMAX, ZigBee™, Wi-Fi direct, Bluetooth, or near field communication (NFC), just to name a few examples.

VSM 18 (FIG. 2) may include an electronic control unit (ECU) 30 comprising one or more processors 32 and memory 34, as well as any other suitable electronic circuitry 36, which may include a wireless receiver or transceiver 38 and associated antenna 40. In some embodiments, the ECU 30 may be enclosed within the module 18 (as shown); however, this is not required. For example, ECU 30 may be a separate device coupled to other components of module 18 or operable with more than one VSM 18.

Non-limiting examples of VSMs 18 include a vehicle telematics unit, an infotainment module, a GPS navigation module, an engine control module (ECM), a powertrain control module (PCM), a body control module (BCM), and a tire pressure monitoring system (TPMS) module. Telematics devices can be used to provide a diverse range of services to vehicle 12 that involve wireless communication to and/or from the vehicle. Infotainment devices can facilitate providing audio/visual information and entertainment services to vehicle occupants. GPS navigation modules can determine vehicle position that is used for providing navigation and other position-related services to a vehicle driver. ECMs can control various aspects of engine operation such as fuel ignition and ignition timing, while PCMs can regulate operation of one or more components of the vehicle powertrain. BCMs can govern various electrical components located throughout the vehicle, like the vehicle's power door locks and headlights. A TPMS module can monitor the air pressure with pneumatic tires on the vehicle and provide alerts when the pressure of one of the tires falls below a predetermined level. These VSMs 18 are only listed by way of example. Other module implementations are also possible.

Processor(s) 32 can be any type of device capable of processing electronic instructions including microprocessors, microcontrollers, host processors, controllers, vehicle communication processors, and application specific integrated circuits (ASICs). It can be a dedicated processor used only for ECU 30 or can be shared with other vehicle systems. Processor 32 executes various types of digitally-stored instructions, such as software or firmware programs stored in memory 34, which enable ECU 30 to provide a wide variety of services. For instance, processor 32 can execute programs or process data to carry out at least a part of the method discussed herein.

Memory 34 may include computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes. In at least one embodiment, memory 34 is a non-transitory computer readable medium.

Receiver 38 includes any suitable device for receiving wireless communications from sensors 20. In at least one embodiment, receiver 38 and antenna 40 are configured to receive sensor data via short-range wireless communication (SRWC) (e.g., via one of the protocols listed above). Receiver 54 may be a transceiver and/or may be used in other vehicle applications (e.g., ECU-to-ECU communication); however, this is not required.

Other electronic circuitry 36 may include any other electronic circuit components or sub-circuits for determining or measuring various characteristics of received sensor signals, as well as for carrying out functions related to the VSM (e.g., engine control, powertrain control, tire pressure monitoring, etc.). In one embodiment, circuitry 36 includes a configuration to suitably measure the strength of (e.g., quantify the power of) wireless signals received from sensors 20 (e.g., determine a received signal strength indication (RSSI)). This of course is merely an example; other implementations are also possible.

It will be appreciated that although the VSM 18 is illustrated schematically, components thereof may be electronically coupled to one another. For example, processor 32 may be coupled to memory 34 and circuitry 36, memory 34 may be coupled to circuitry 36 as well, etc. In addition, memory 34 of ECU 30 is shown to include application software 42 stored thereon which is executable by processor(s) 32. This application software comprises a set of instructions that may be carried out to verify or validate the source of the sensor data; i.e., to make sure that sensor data received at ECU 30 via the wireless link 16b is legitimate and not spoofed by a malicious attacker. Therefore, as will be explained in greater detail below, application software 42 provides at least one means for carrying out the methods described herein.

FIGS. 1 and 2 further illustrate a malicious attacker or intruder 50. As used herein, the malicious attacker 50 is any person and/or computing device intending to provide false or misleading information or data to the ECU 30. In at least one contemplated scenario, the attacker 50 wirelessly provides falsified data to ECU 30—representing the falsified data as genuine or real data and sent from one of the sensors 20 (i.e., attacker 50 masquerades as one of the actual sensors 20 in order to achieve a malicious purpose or gain illegitimate advantage). In the methods described below, a tire pressure monitoring system (TPMS) module is used to illustrate VSM 18, as well as how wirelessly transmitted data from attacker 50 can be discovered and can be ignored. Thus, as will be explained in greater detail below, the attacker 50 could spoof a TPMS sensor 20 wirelessly providing falsified or inaccurate data to TPMS module 18. In this manner, the attacker 50 could falsely alert the driver to a tire low-pressure condition or could maliciously inhibit an alert to the driver (i.e., falsely fail-to-alert)—e.g., when in fact a low-pressure condition exists. It will be appreciated that the methods described below are not limited to a vehicle TPMS module and its associated sensors. Thus, it will be appreciated that the TPMS module and sensors described below are merely an example and that other vehicle implementations are contemplated.

Method—

Figure 3:
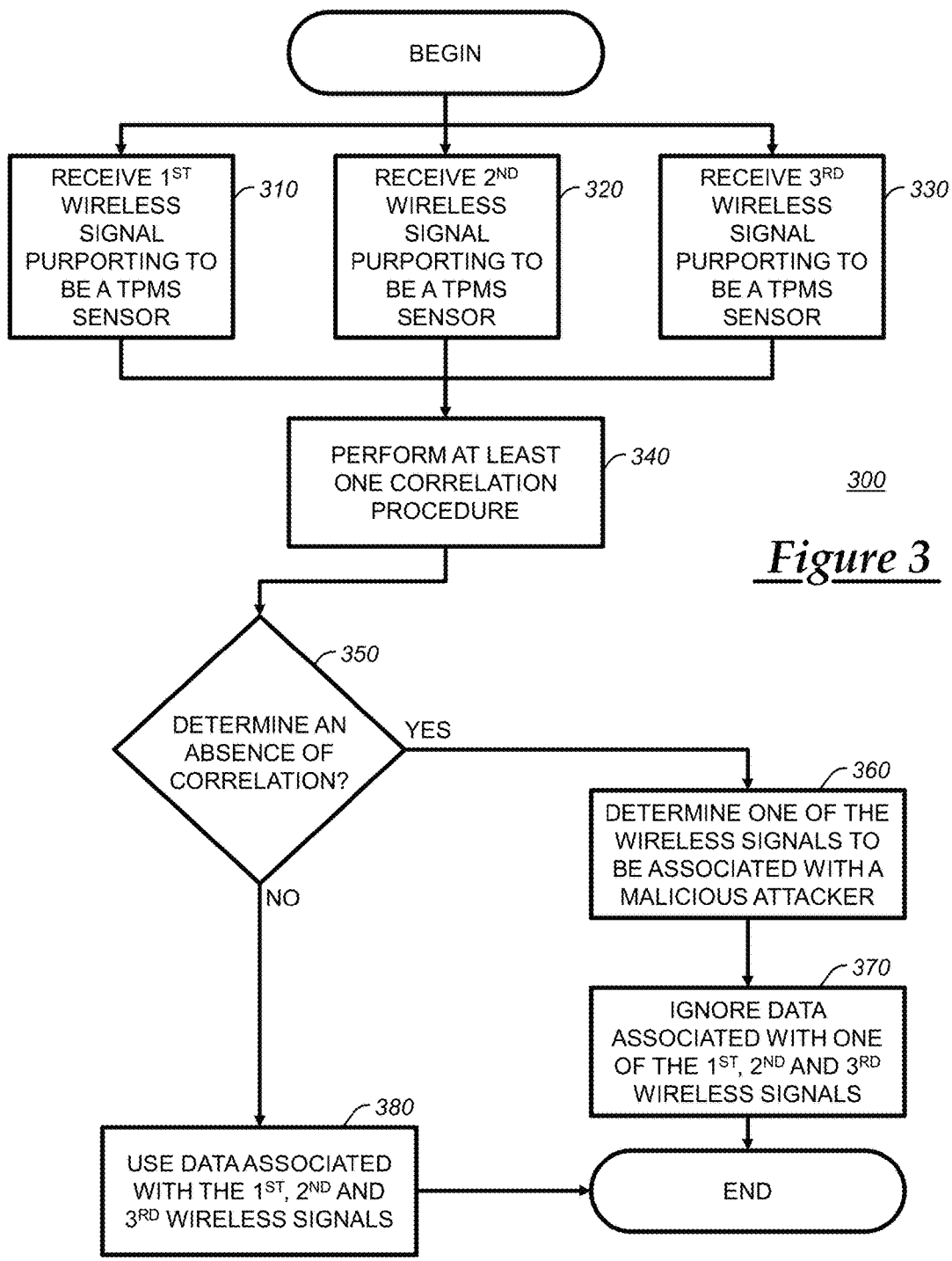
FIG. 3 is a flow diagram illustrating one method of securely transmitting wireless signal data between vehicle components.

Turning now to FIG. 3, there is shown a method 300 for determining a malicious attack at vehicle 12 (e.g., see also FIG. 2 throughout method 300). The method begins with steps 310, 320, and 330 in which ECU 30 receives first, second, and third wireless signals associated with the TPMS module 18. These wireless signals may be received in real-time; however, it should be appreciated that the initial of reception of each signal may occur at differing times. For example, in at least one embodiment, the third wireless signal may be received by ECU 30 while the first and second wireless signals are already being received. According to one embodiment, the first wireless signal could be transmitted from sensor 20a (e.g., a TPMS gauge sensor), and the second wireless signal could be transmitted from sensor 20b (e.g., a TPMS differential pressure sensor). In the illustrated scenario, the third wireless signal is being transmitted by attacker 50 masquerading as 20a (or 20b)—and the TPMS module 18 uses method 300 to determine a malicious spoofing attack. In some scenarios, a single wireless signal is used; in other scenarios, more than two wireless signals may be expected or typical (e.g., in some vehicle systems, ECU 30 routinely may process wireless signals from redundant sensors 20). Therefore, the mere presence of more than one or two wireless signals may not alert the TPMS module 18 of a potential attack. In other circumstances however it may alert the TPMS module to an attack—but without method 300, TPMS module 18 would not be able to identify which of the three wireless signals is illegitimate and has a malicious source.

It should be appreciated that method 300 does not preclude the use of other security techniques which may require extensive computations (e.g., for encryption and decryption). However, it will be appreciated that in at least one embodiment, the first, second, and/or third wireless signals may not be encrypted or decrypted. And without performing encryption in method 300, undesirable system latencies may be avoided. Following steps 310, 320, and 330, the method proceeds to step 340.

In step 340, the ECU 30 performs at least one correlation procedure. As used herein, a correlation procedure includes evaluating a relationship in the change of two wireless signals received by the ECU. For example, consider the ECU 30 receiving the first wireless signal and the second wireless signal (e.g., from sensors 20a, 20b) in real-time. The correlation procedure may determine that the two wireless signals have correlation (or are highly correlated to one another) or that they do not have correlation (e.g., an absence of correlation). As used herein, an absence of correlation includes any suitable instance where a skilled artisan would consider the correlation sufficiently low to determine that the relationship fails to indicate spatial or temporal correlation between the evaluated signals. This includes instances where two or more signals are evaluated or even a single signal is evaluated at different times—both examples are discussed in greater detail below. When the two signals have correlation, the relationship between the two signals may be causal, parallel, reciprocal, or the like. A causal relationship may occur, e.g., when changes in the first wireless signal (from 20a) directly cause changes in the second wireless signal (20b) (e.g., signals may simply be out of phase from one another). A parallel relationship may occur, e.g., when the second wireless signal (20b) changes with the same magnitude and in the same direction as the changing magnitude and direction of the first wireless signal (20a) [e.g., either both positive or both negative]. And a reciprocal relationship may occur, e.g., when the second wireless signal (20b) changes with the same magnitude of the first wireless signal (20a) but in an opposite direction [e.g., when 20a is positive, then 20b is negative, or vice-versa]. The correlation procedure further may determine a degree of correlation between two wireless signals. For example, correlation may be determined when the correlation is relatively high or above a predetermined threshold. This threshold may consider a number of factors, including but not limited to the distance between the sensors, the circuitry coupled to the sensors, and the type of sensing system used.

Figure 4:
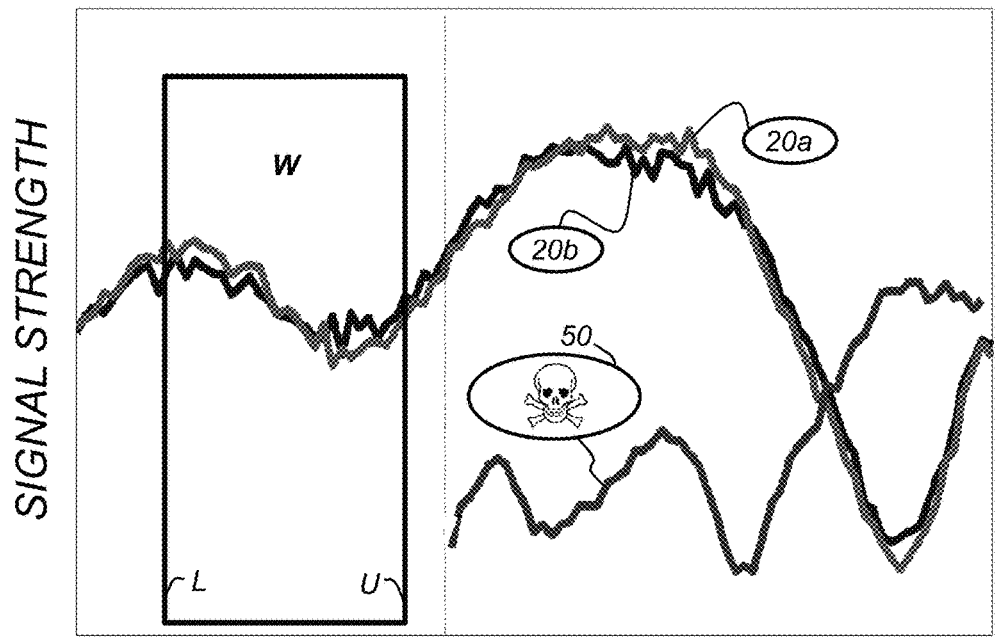
FIGS. 4-7 illustrate graphical depictions of different wireless signal-related data from vehicle sensors and a malicious attacker.
Figure 6:
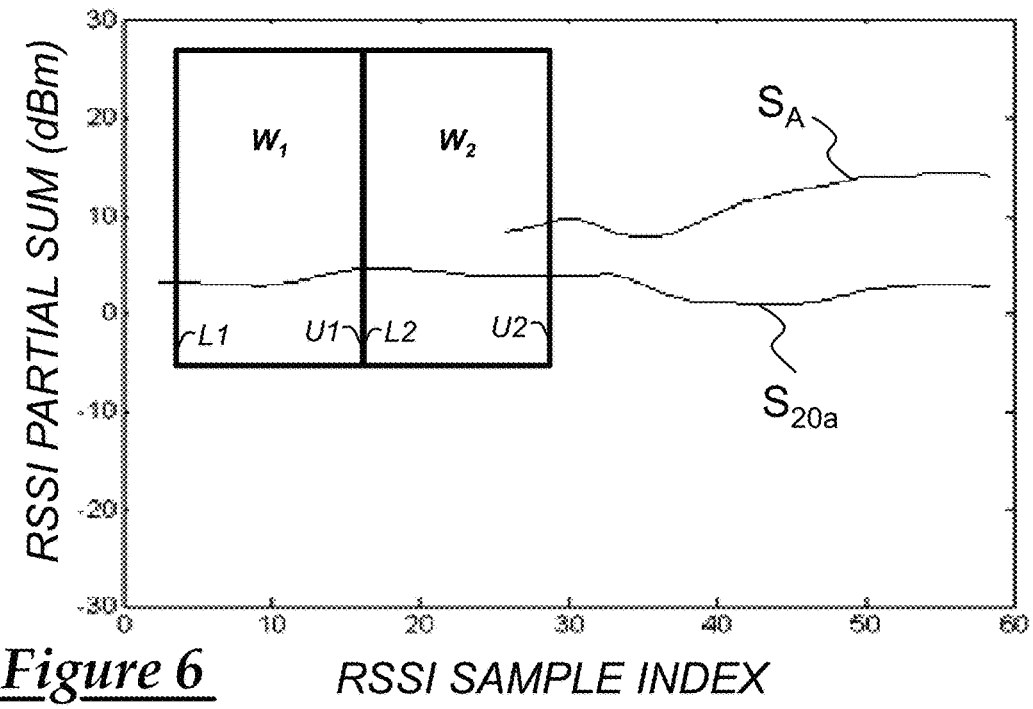

The correlation procedure may evaluate a signal within a window of time or frequencies—e.g., it may use a window function where the window has an upper limit (U, U1, U2, etc.) and a lower limit (L, L1, L2, etc.) (e.g., a time range in the time domain or a frequency range in the frequency domain). Windowing a signal in the time domain or in the frequency domain is known to skilled artisans and will not be elaborated further here. Examples of windowing are shown in FIGS. 4 and 6. It will be appreciated that the signal data evaluated within the window is constantly changing—e.g., as the wireless signal data is received in real-time.

The correlation procedure may include determining a wireless signal strength of each of the wireless signals (steps 310, 320, 330). In one embodiment, this is a relative signal strength (e.g., using a relative signal strength indicator or indication or RSSI). The correlation procedure further may comprise determining a correlation coefficient of the wireless signal strengths (e.g., determining a correlation coefficient may include performing a cross-correlation that is normalized for signals within a particular window). In another implementation, the correlation procedure includes using two windows (e.g., two adjacent windows) to analyze an RSSI sample index and also may include performing a correlation coefficient of the wireless signal RSSI sample index values (e.g., an autocorrelation that is normalized). Examples of these techniques are shown in FIGS. 4-7 and will be discussed in greater detail below. It should be appreciated that these techniques are merely examples and other suitable techniques also may be used.

FIG. 4 illustrates a portion of a spatial correlation procedure. FIG. 4 shows a parallel correlation between the signal strength of the first and second sensors 20a, 20b—i.e., the signal strength magnitudes and directions are substantially identical as both signals are received in real-time. This parallel correlation indicates a close spatial relationship (d, FIG. 2) of the first and second wireless signals (e.g., gauge sensor 20a and differential pressure sensor 20b are in close proximity). FIG. 4 also illustrates an absence of correlation (or non-correlation). Here, reception at ECU 30 of the third wireless signal begins following reception of the first and second wireless signals, and the signal strength of the third wireless signal (transmitted by the attacker 50) is not parallel to either of the first or second wireless signal strengths (associated with 20a, 20b, respectively). This absence of correlation indicates that the spatial proximity of attacker 50 is not in close proximity to sensor 20a. When such an attack occurs, the third wireless signal (50) may replace one of first or second wireless signals (20a, 20b)—i.e., the third wireless signal spoofs, e.g., the wireless signal of sensor 20b.

In at least one embodiment of the gauge sensor 20a and differential pressure sensor 20b, physical proximity (d) of the sensors 20a and 20b is less than or equal to one wavelength (λ) of the SRWC means (i.e., d≤λ). For example, if the wireless transmission frequency of the gauge and differential pressure sensors 20a, 20b is 2.4 GHz, then the spacing between sensors 20a and 20b is less than or equal to 0.125 meters.

Figure 5:
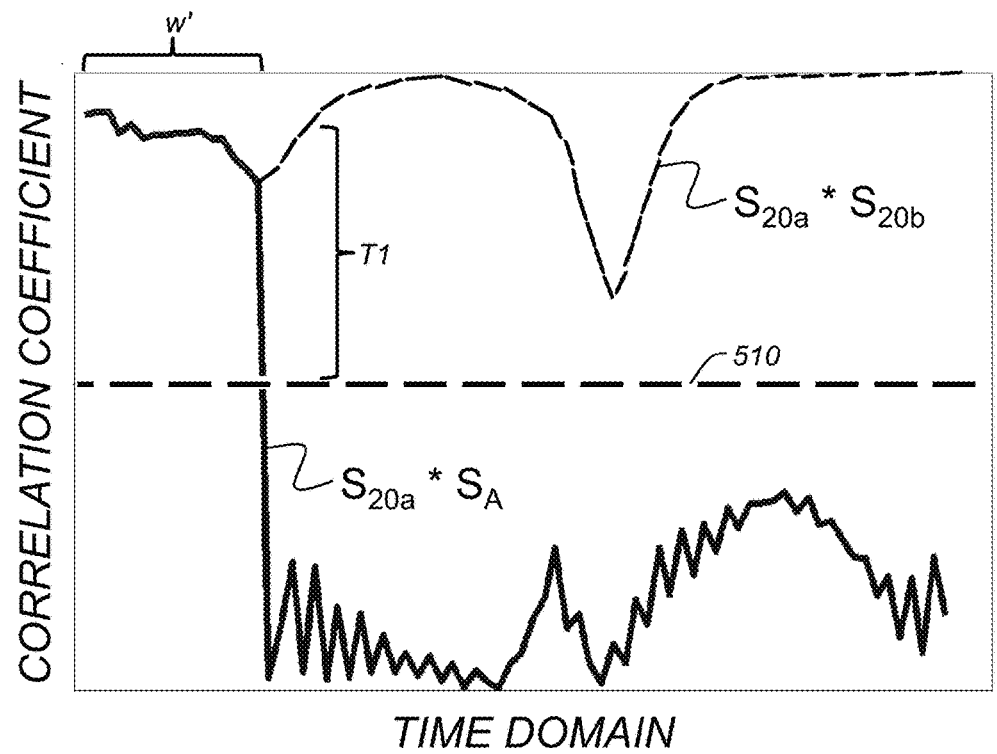

FIG. 5 illustrates a technique which may be employed to determine whether correlation between sensors 20a and 20b is maintained. For illustration purposes only, a correlation coefficient is shown for both signal strengths $S_{20a}$, $S_{20b}$ of the first and second wireless signals (20a, 20b) (respectively), as well as a correlation coefficient of the signal strength $S_{20a}$ of the first wireless signal strength (from sensor 20a) with the signal strength $S_A$ of the third wireless signal (from attacker 50). Of course, a drop in the correlation coefficient of signal strengths $S_{20a}$ and $S_A$ could occur when the attacker spoofs the second wireless signal $S_{20b}$, as discussed above. FIG. 5 shows that a predetermined threshold 510 may be crossed during the correlation coefficient technique when the attacker spoofs sensor 20b (i.e., a relatively low correlation between the wireless signals). When the magnitude of the cross-correlation shifts a predetermined amount T1, method 300 will determine an attack by malicious attacker 50. The predetermined threshold 510 may be a fixed magnitude or may float with respect to the previous correlation coefficient value (see region w′).

Referring still to FIG. 5, it is presumed that attacker 50 may use the same frequency as sensors 20a, 20b; it is also presumed however that the spatial proximity of the attacker to the differential pressure sensor 20b is substantially greater than the spatial proximity of sensor 20a to sensor 20b; i.e., the distance between the attacker 50 and sensor 20b is much greater than value d. Therefore, a correlation coefficient of the first and third wireless signals will result in a crossing of the threshold 510, as shown in FIG. 5. Of course, should the correlation coefficient of the signal strengths of the second and third wireless signals be determined (as opposed to the first and third signals), the same result would be expected, since sensors 20a and 20b are located proximately to one another. In other words, it is presumed that sensor 20b also is spaced from attacker 50 at a distance greater than d.

FIG. 6 illustrates a portion of a temporal correlation procedure. It includes a double-window or double-windowing function (using windows $W_1$, $W_2$) in the time domain where the magnitude of the wireless signals is a RSSI partial sum (dBm). Windows $W_1$, $W_2$ are arranged such that the upper limit (U1) of the first window $W_1$ is coincident with the lower limit (L2) of the second window $W_2$—i.e., data captured (or 'windowed') in the first window $W_1$ lags data captured in the second window $W_2$. However, this is merely an example (e.g., the windows $W_1$ and $W_2$ could overlap or be spaced in other embodiments.) In the double-windowing function, the signal strength of the first wireless signal $S_{20a}$ is captured within window $W_1$ (i.e., between $W_1$'s lower and upper limits), and the signal strength of the same wireless signal $S_{20a}$ is captured within the second window $W_2$ (i.e., between $W_2$'s lower and upper limits). In addition, the third wireless signal strength $S_A$ of the attacker is captured within the second window $W_2$.

Figure 7:
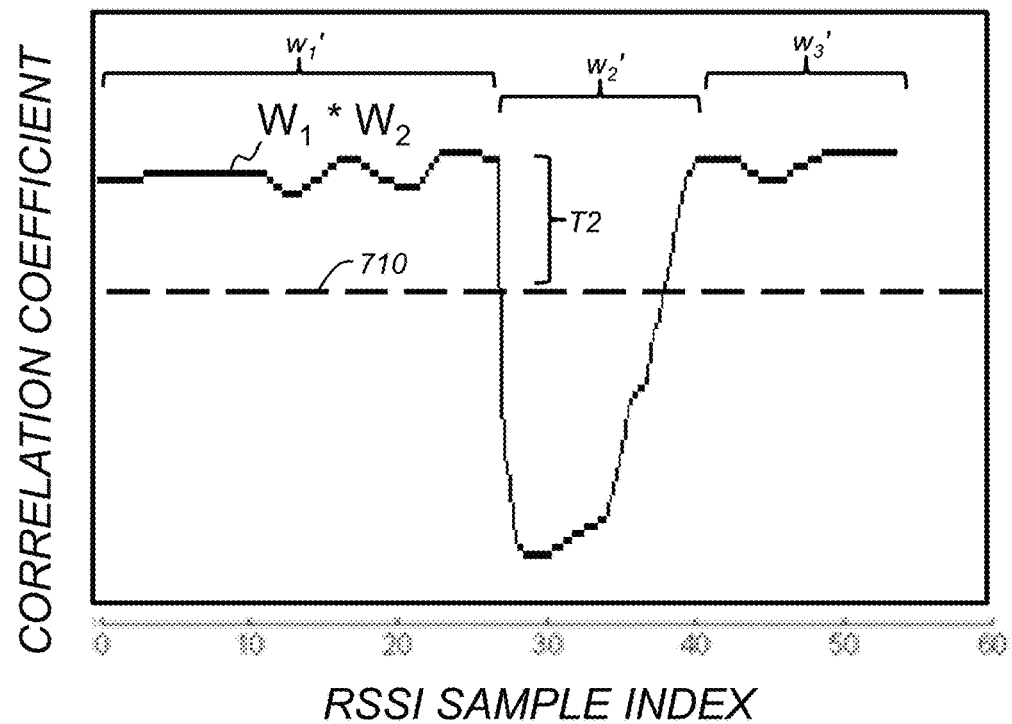

FIG. 7 illustrates a technique which may be employed to determine whether high correlation exists between the first wireless signal strength (associated with sensor 20a in window $W_1$) and the first wireless signal strength of sensor 20a (in window $W_2$). A correlation coefficient is performed—this time, a normalized autocorrelation of the signals within windows $W_1$ and $W_2$ of FIG. 6. This may be accomplished by buffering the signal data captured in window $W_1$ and then comparing it to the signal data of window $W_2$ (e.g., window $W_2$ may be occurring in real-time). Thus, first window $W_1$ (FIG. 6) corresponds to region $w_1'$ (FIG. 7) while second window $W_2$ (FIG. 6) corresponds to region $w_2'$ (FIG. 7). Thus, prior to the introduction of the third wireless signal strength $S_A$ (in FIG. 6), the correlation of window $W_1$ to window $W_2$ would be expected to be generally high (as shown in region $w_1'$)—since the first wireless signal of sensor 20a is being autocorrelated with only itself. However, once third wireless signal strength $S_A$ is introduced (as shown in FIG. 6), then the correlation coefficient of windows $W_1$ and $W_2$ would be expected to deviate moving lower and cross a predetermined threshold 710 (as shown in FIG. 7, region $w_2'$). Predetermined threshold 710 may be any suitable threshold and may be a fixed magnitude. In addition, the predetermined threshold may be associated with a predetermined amount T2 (e.g., where T2 is a difference between a magnitude of region $w_1'$ and threshold 710, similar to that described with respect to threshold 510). Thus, by using two windows $W_1$ and $W_2$, temporal correlation can be determined ($w_1'$) and, where applicable, an absence of temporal correlation ($w_2'$) also can be determined. And when an absence of correlation is determined, this conclusion may be associated with malicious attacker 50, as discussed below. It should be appreciated that crossing threshold 710 may be temporary; e.g., once both windows $W_1$ and $W_2$ include both the first and third wireless signals (not shown in FIG. 6), the autocorrelation of windows $W_1$ and $W_2$ would be expected to move relatively high again (this is illustrated by region $w3'$ in FIG. 7).

The techniques described above may be implemented in step 340 of method 300. These techniques may be implemented individually or in combination with one another. For example, one or more correlation procedures may be performed for any particular sensor 20. Any or all of these implementations may be performed using software application 42 stored on ECU memory 34. Processor 32 may be configured to perform instructions of application 42 to perform one or more correlation procedures in step 340 and perform one or more of the remaining steps of the method 300. Following step 340, the method proceeds to step 350.

In step 350, processor 32 determines whether an absence of correlation exists based on the correlation procedure performed in step 340. Again, an absence of correlation may exist when the wireless sensor data indicates non-spatial or non-temporal correlation (e.g., when the third wireless signal does not correlate (or does not highly correlate) with the first or second wireless signals, as described above). When an absence of correlation exists, the method proceeds to step 360; and when an absence of correlation does not exist, the method proceeds to step 380.

In step 360, the method may determine which one of the received wireless signals is associated with malicious attacker 50. For example, where a normalized autocorrelation procedure is performed, it may be apparent which wireless signal is being spoofed. Or for example, a number of correlation coefficients may be performed and the wireless signal associated with the attacker 50 may be apparent by a process of elimination. These are merely examples; other techniques may be employed as well. And in some instances, it may not be desirable to identify which sensor is being spoofed; i.e., it may be sufficient to merely identify that an attack is occurring. In step 360, the ECU 30 may send an alert to other VSMs 18 in the vehicle. This alert may be reported to the user of the vehicle, a vehicle service center, and/or a backend system. Then the method proceeds to step 370.

In step 370, the method ignores data associated with at least one of the first, second, or third wireless signals—e.g., where the third wireless signal strength $S_A$ was determined to be associated with attacker 50. Of course, the legitimate data (carried by the first and second wireless signals) may be used by the TPMS module 18. In other embodiments, at least a portion of data collected in the TPMS 18 may be ignored until the TPMS is serviced by maintenance personnel. Thereafter, method 300 ends.

Returning to step 380, in step 380 the data from each of the first, second, and third wireless signals is used. Thus, in at least one implementation of steps 340 and 350, no malicious attacker was discovered. For example, in TPMS module 18, there may be multiple or redundant sensors (e.g., a redundant gauge sensor). Thus, data from all three sensors may be used. As discussed above, FIGS. 1 and 2 illustrated only two sensors associated with ECU 30; however, three or more sensors could also be associated. And following step 380, the method ends.

Other implementations also exist. In at least one implementation, two sensors such as 20a and 20b are used and other wireless sensor signals within vehicle 12 are distinguished from one another using method 300. For example, assume TPMS module receives data from only two wireless sensors which are proximately located with respect to one another. And then assume that the engine control module (ECM) has one wireless sensor which is spaced from the TPMS sensors. Method 300 may be used by the TPMS module to ignore data sent by the ECM sensor, e.g., treating the ECM sensor as malicious. This of course is merely another example of how method 300 may be utilized. Other methods will be apparent to skilled artisans.

Thus, there has been described a vehicle communication network that has a number of electronic control units (ECUs) (e.g., associated with various vehicle system modules). At least some of the ECUs are in wireless communication with one or more sensors. In order to maintain network security, at least one correlation procedure is performed using wireless signal data received by the one or more sensors. Wireless signals from malicious attackers are determinable using the correlation procedure(s). The system may provide continuous, real-time authentication if desired. Moreover, the system described herein has fewer latencies, as the wireless transmissions do not require encryption to protect the system and vehicle.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of determining the legitimacy of a wireless sensor signal received by an electronic control unit (ECU) installed in a vehicle, comprising the steps of:
   receiving at the electronic control unit (ECU) a first wireless signal purportedly received from a first vehicle sensor installed within the vehicle;
   receiving at the ECU a second wireless signal;
   performing a correlation procedure at the ECU using the first wireless signal and the second wireless signal to verify that the first wireless signal is a legitimate signal in that it originated from the first vehicle sensor, wherein the correlation procedure includes using a first window and a second window that capture a signal strength of the first wireless signal, wherein the first window captures the first wireless signal during a first time period and the second window captures the first and the second wireless signals during a second time period that differs from the first time period; and
   determining that the first wireless signal is not a legitimate signal sent by the first vehicle sensor when an absence of correlation exits between the first and second windows based on the correlation procedure, wherein the absence of correlation occurs as a result of the signal strength of the first window differing from the signal strength of the second window.

2. The method of claim 1, wherein the correlation procedure includes performing an autocorrelation function using the first and second windows.

3. The method of claim 2, wherein the autocorrelation function is part of a correlation coefficient technique.

4. The method of claim 1, wherein the correlation procedure further comprises providing an alert from the ECU indicating that the first wireless signal is not a legitimate signal.

5. The method of claim 1, wherein the correlation procedure occurs in real-time.

6. The method of claim 1, wherein the ECU is associated with a vehicle system module (VSM) in the vehicle.

7. A method of determining the legitimacy of a wireless sensor signal received by an electronic control unit (ECU) installed in a vehicle, comprising the steps of:
   receiving at the ECU a first wireless signal received from a first vehicle sensor installed within the vehicle;
   receiving a second wireless signal at the ECU from a second vehicle sensor installed within the vehicle, wherein the second wireless signal is being spoofed by a malicious attacker;
   performing a correlation procedure at the ECU using the first and second wireless signals; and
   detecting the occurrence of a malicious attack based on an absence of correlation between the first and second wireless signals, wherein the correlation procedure includes using a window that captures the signal strengths of the first and second wireless signals, and wherein prior to detecting the occurrence of the malicious attack, the first and second wireless signals exhibit correlation and following the second wireless signal being spoofed by the malicious attacker, the correlation procedure determines an absence of correlation between the first and second wireless signals.

8. The method of claim 7, wherein the correlation procedure includes evaluating a correlation coefficient using the first and second wireless signals.

9. The method of claim7, wherein the correlation of the first and second wireless signals from the vehicle sensors is based on a spatial proximity of the first and second vehicle sensors, wherein the absence of correlation is determined based on a lack of spatial proximity of the first vehicle sensor and the malicious attacker.

10. The method of claim 9, wherein the spatial proximity of the first and second vehicle sensors is less than or equal to one wavelength of a frequency of the first and second wireless signals transmitted by the first and second vehicle sensors.

11. The method of claim 7, wherein the first wireless signal and the second wireless signal are received without encryption.

12. The method of claim 7, wherein the first wireless signal and the second wireless signal are received according to a short range wireless communication (SRWC) protocol.

* * * * *